Dec. 9, 1947. E. W. VARS 2,432,357
TRAILER HITCH
Filed June 25, 1946 9 Sheets-Sheet 1

INVENTOR.
ETHAN W. VARS.
BY
HIS ATTORNEYS

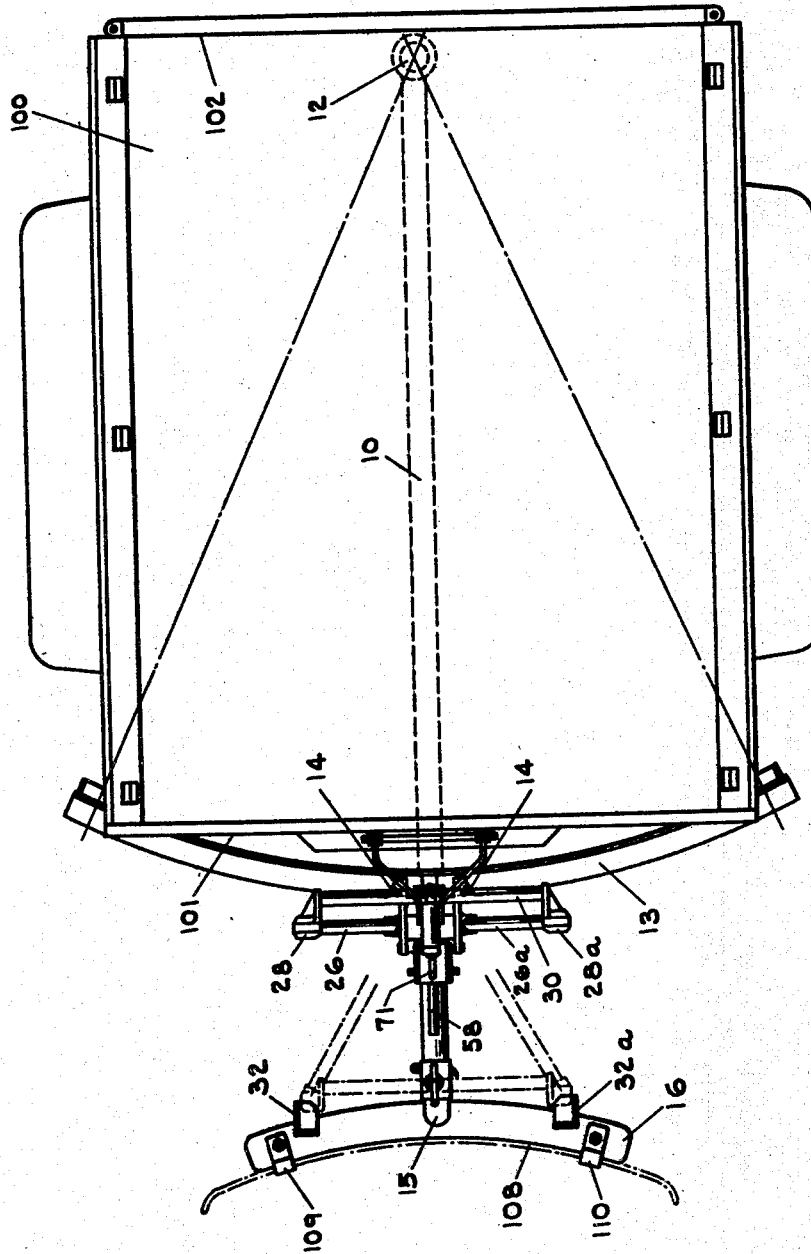

Dec. 9, 1947.  E. W. VARS  2,432,357
TRAILER HITCH
Filed June 25, 1946  9 Sheets-Sheet 3

INVENTOR.
ETHAN W. VARS
BY
HIS ATTORNEYS

Dec. 9, 1947.  E. W. VARS  2,432,357
TRAILER HITCH
Filed June 25, 1946  9 Sheets-Sheet 4

INVENTOR.
ETHAN W. VARS
BY
*Des Jardins & Longston*
HIS ATTORNEYS

Dec. 9, 1947.   E. W. VARS   2,432,357
TRAILER HITCH
Filed June 25, 1946   9 Sheets-Sheet 5

INVENTOR.
ETHAN W. VARS
BY
HIS ATTORNEYS

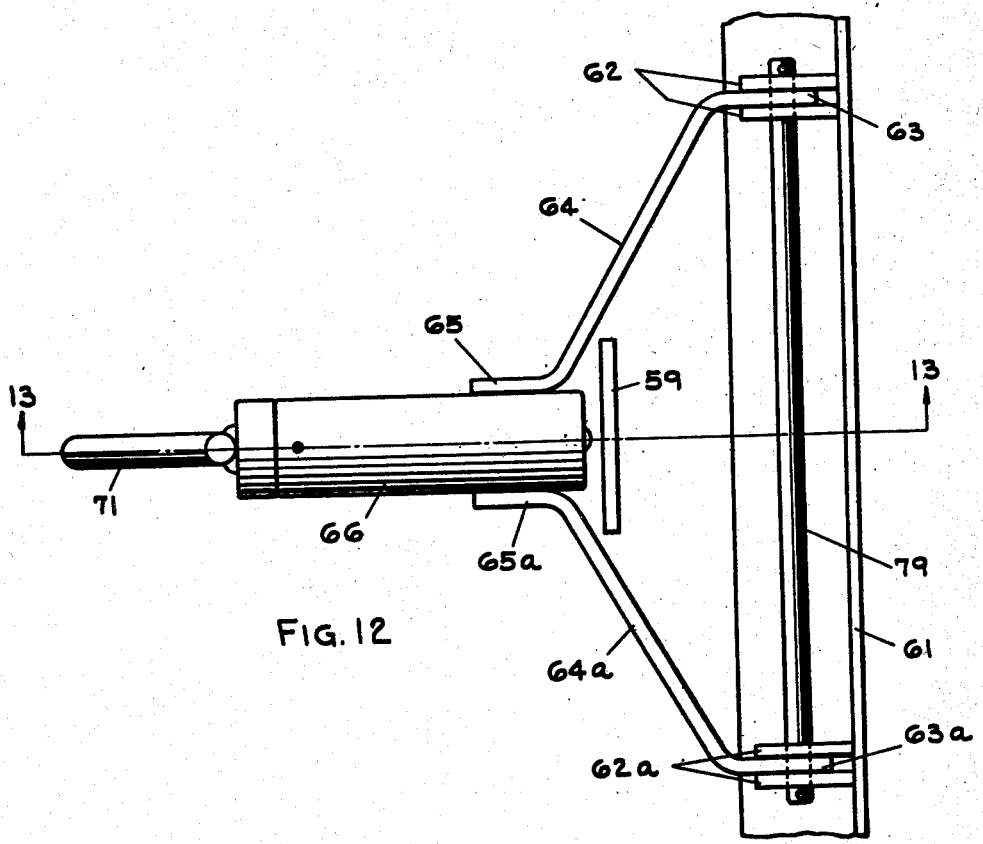
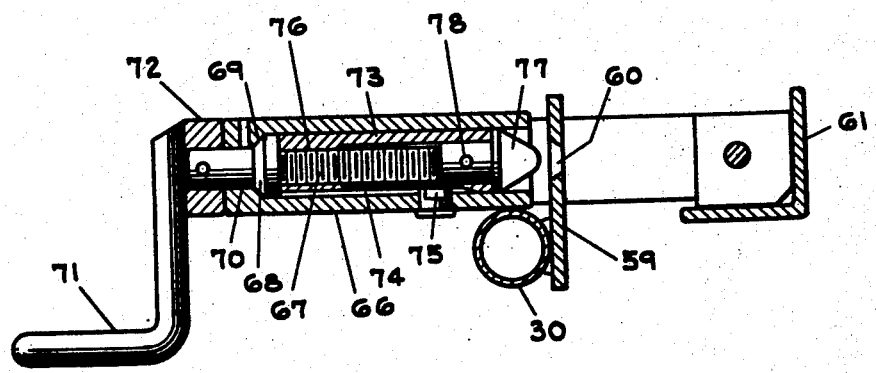

Dec. 9, 1947. E. W. VARS 2,432,357
TRAILER HITCH
Filed June 25, 1946 9 Sheets-Sheet 8
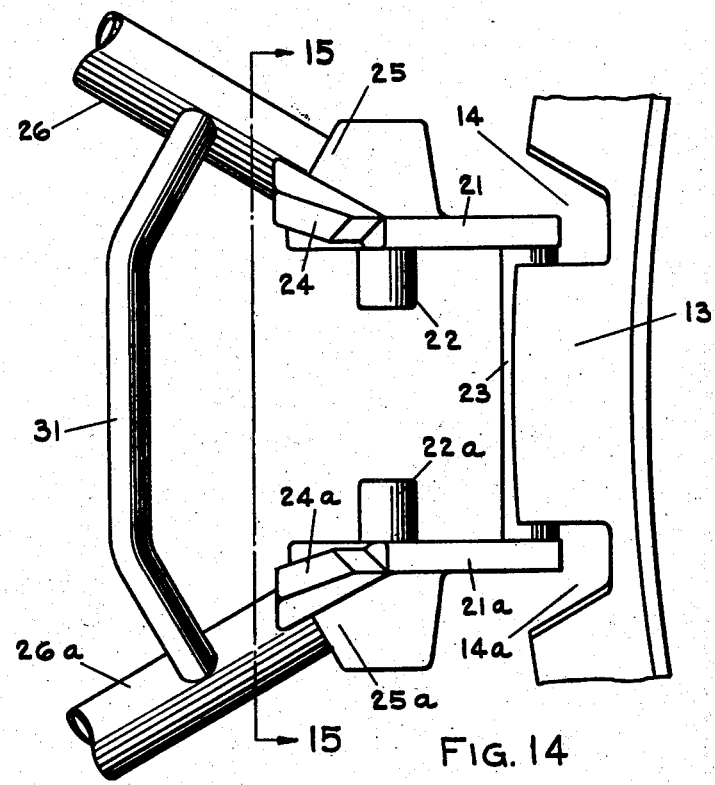
FIG. 14
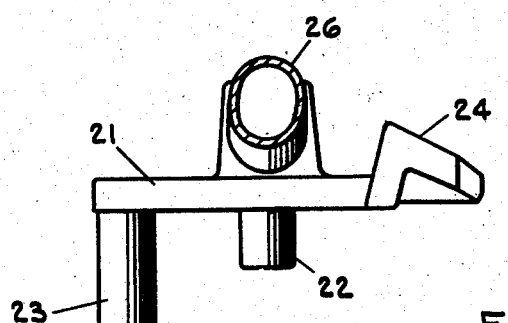
FIG. 15
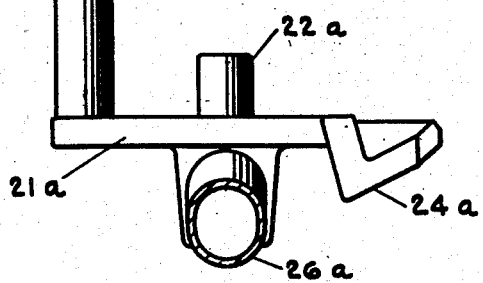
INVENTOR.
ETHAN W. VARS
BY
HIS ATTORNEYS

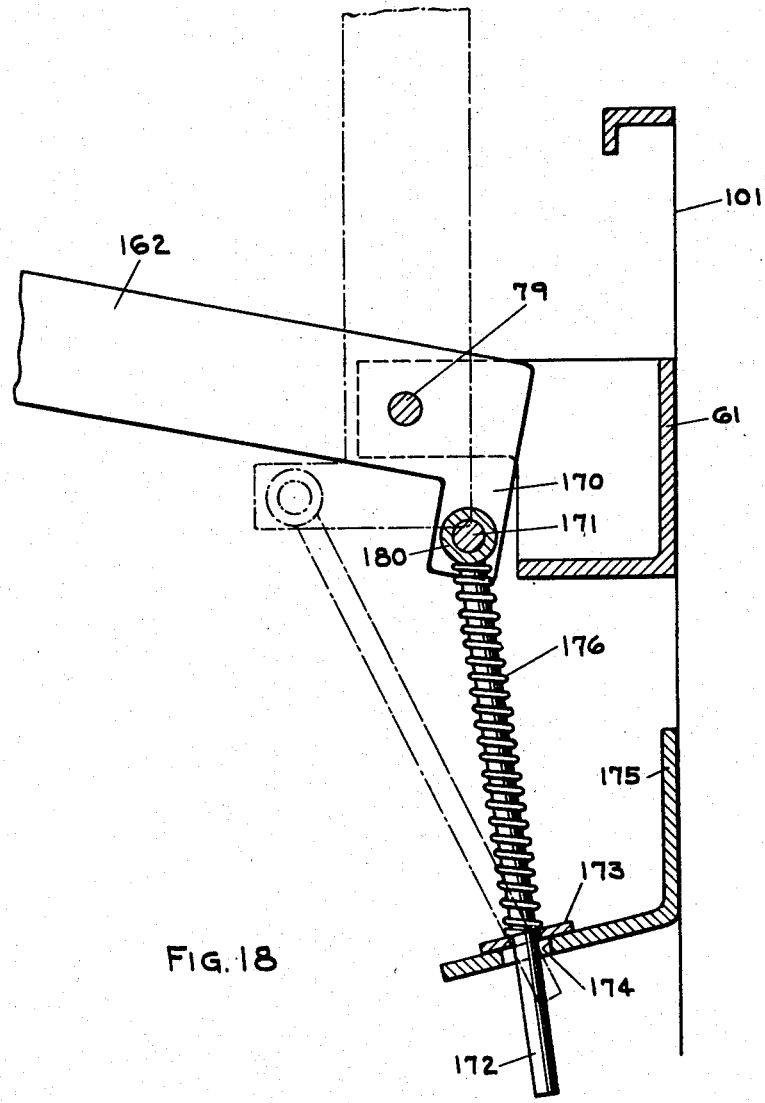

Patented Dec. 9, 1947

2,432,357

UNITED STATES PATENT OFFICE 2,432,357

TRAILER HITCH

Ethan W. Vars, Duncannon, Pa., assignor to Alvin P. Bixler, doing business as Aldon Products Company, Duncannon, Pa.

Application June 25, 1946, Serial No. 679,227

16 Claims. (Cl. 280—33.4)

This invention relates to a trailer hitch, and more particularly pertains to a hitch for a two-wheel trailer vehicle, which hitch is adjustable for forward or backward movement of the trailer by a tractor vehicle.

This is an improvement of the trailer hitch disclosed in my co-pending patent application Serial No. 648,591, filed February 19, 1946, in the United States Patent Office, and the improvement is directed to an adjustable feature which is movable one way to adjust the trailer for backing and movable the other way to adjust the trailer for forward motion, and the particular points of improvement pertain first to the holding of the adjustable means in an intermediate position so that the trailer and the tractor vehicle which draws it may be readily hitched to one another, second to a means for locking the adjustable means, and third to improved brake means to prevent yawing of the trailer.

The particular type of hitch which I have provided is for use with a two wheeled trailer having a transverse axle, and includes a tongue pivoted to the trailer rearwardly of the two wheels thereof for horizontal movement and pivoted to the tractor vehicle for universal movement. The tongue is fastened against movement around said trailer pivot when the trailer is to be drawn in a forward direction, and the tongue is freed so that it may move around the trailer pivot on backward motion of the trailer, in which latter case the tongue is made rigid with the longitudinal center line of the tractor vehicle. Means is provided to hold the adjustable member in an intermediate position, in which the tongue is free to swing in a horizontal movement around either pivot, and to bring into action a release for a damping brake which normally functions, so as to prevent the yawing of the trailer when it is driven rearwardly, by snubbing the horizontal swing of the trailer with respect to the tongue.

Therefore, it is the principal object of this invention to provide an improved means for my novel trailer hitch which is adjustable for forward and rearward movement of the trailer, by providing said adjustable means with an intermediate position in which the tongue is free to move on either the trailer pivot or the tractor pivot.

Another object of the invention is to provide a means to lock the adjustable means in position for forward movement.

Further objects, and objects relating to the details and economies of construction will definitely appear from the detailed description to follow. In one instance, I have accomplished the objects of my invention by the devices and means as set forth in the following specification. My invention is clearly defined and pointed out in the appended claims.

Structures, constituting the preferred embodiment of my invention, are illustrated in the accompanying drawings, forming a part of this specification, in which:

Fig. 2 is a plan view of the substance of Fig. 1.

Fig. 12 is a plan view of the means for locking the adjustable means in position for forward motion of the trailer before the crank screw is operated.

Fig. 13 is a detail sectional view on the line 13—13 of Fig. 12.

Fig. 14 is a plan view of the cam locking mechanism which makes the tongue rigid with the longitudinal center line of the trailer.

Fig. 15 is a sectional view of the substance of Fig. 14 on the line 15—15.

Fig. 18 is a side elevation of a modified form of the locking bail, showing means for resiliently holding the bail in either a vertical or horizontal plane.

In the drawings, the same reference numerals refer to the same parts throughout the several views, and the sectional views are taken looking in the direction of the arrows at the ends of the section line.

Figure 17:
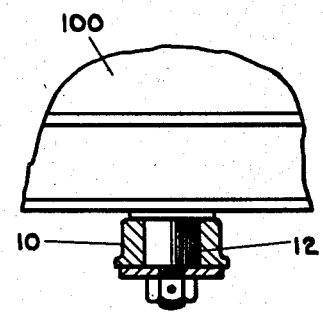
Fig. 17 is a sectional view of the pivot mounted on the rear end of the frame of the trailer as taken on the line 17—17 of Fig. 1.
Figure 16:
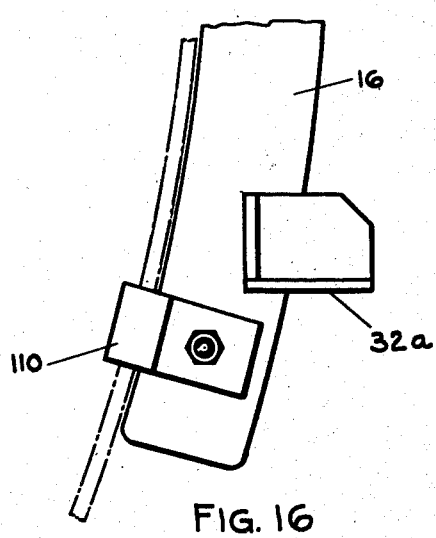
Fig. 16 is a plan view of the portion of the draw bar attached to the tractor vehicle, showing the left abutment rest for the adjustable means.

Referring to the numbered parts of the drawings, the trailer bed 100 (Figs. 1 and 2) has fastened transversely thereof, underneath the bed, by springs, an axle 11 situated between the front 101 of the trailer bed and the rear 102 of the trailer bed. A wheel, like left wheel 103 is mounted on either outer end of the axle to provide a two-wheeled running gear. A tubular tongue 10, is pivotally connected to the trailer bed, at a point to the rear of the axle 11 by a vertical pivot pin 12 (see Fig. 17), which pin is located in line with the longitudinal center line of the trailer. The tongue extends forwardly underneath the trailer bed and is swingable about the pin 12 in a horizontal manner, between the wheels, parallel with the bottom of the trailer bed. Fastened to the front end of the trailer is an arcuate track 13, concentric with the pivot pin 12, and positioned in a plane adjacent to and parallel with the plane of horizontal swing of the tongue 10. This track is formed with a vertically extending flange 104 (Fig. 8) and a forwardly extending horizontal flange 105. Two notches 14 (Fig. 6) are formed in the horizontal flange of this track, on either side of the longitudinal center line of the trailer. An abutment collar 18 (Fig. 8), having a flat top surface, is secured to the tongue 10 and to the top of abutment collar 18 is bolted a plate 33 having a rearwardly extending portion which engages the top surface of the horizontal flange of the track 13, which prevents the front end of the tongue from dropping in relation to the trailer frame. The forward end of the tongue 10 (Fig. 1) is connected for universal motion, by a ball-and-socket connection 15, which may be of the construction shown in my co-pending application for United States Letters Patent, Serial No. 648,591, filed February 19, 1946, to which reference has been made, to a transverse draw bar 16 fastened to the rear end of a tractor vehicle having a frame member, as for instance an automobile 107 having a bumper 108 to which the draw bar is attached by means of clamps and bolts indicated at 109 and 110 (Fig. 2).

Figures 3, 4:
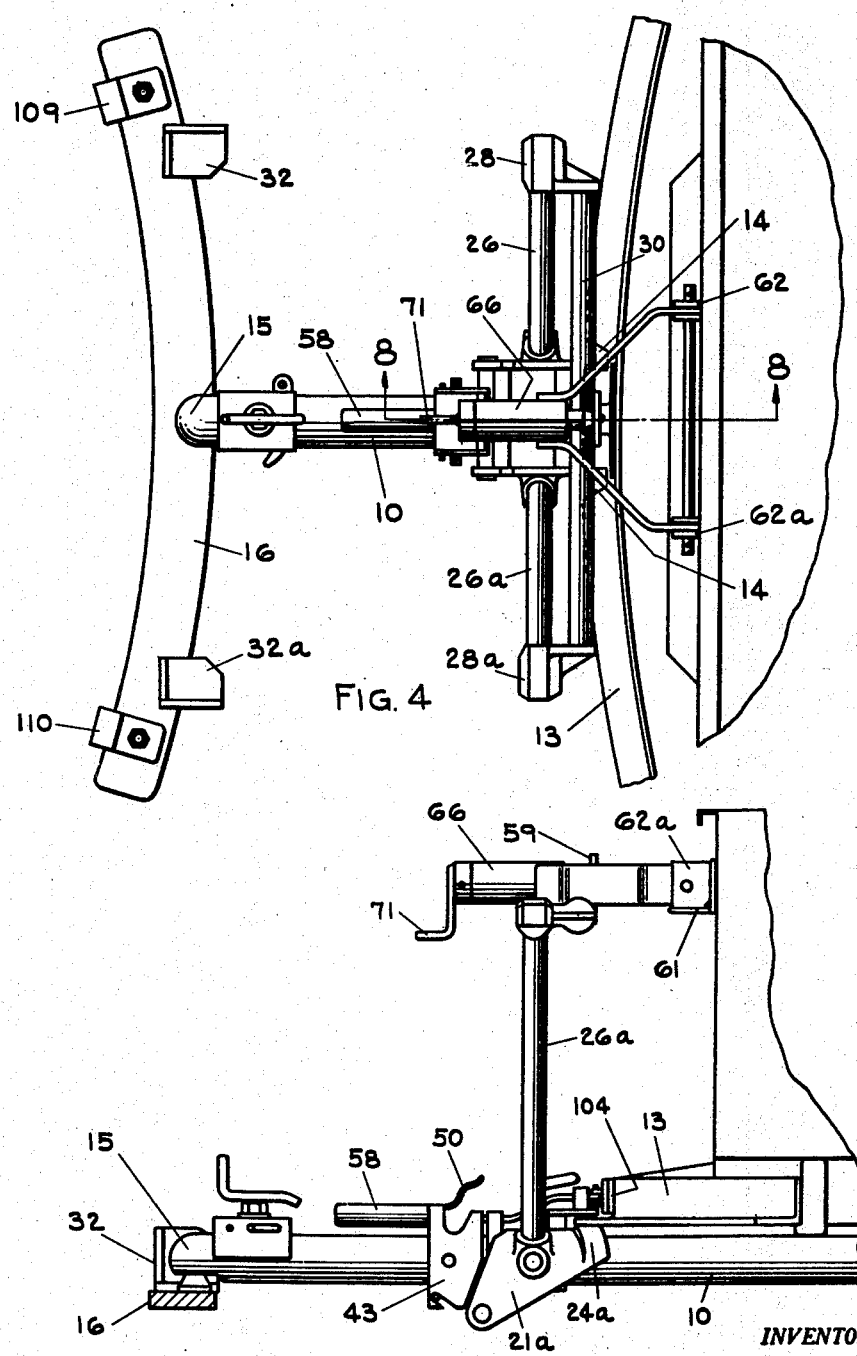
Fig. 3 is a detailed view, in side elevation, as viewed from the left-side of the trailer and tractor vehicle, showing the adjustable means, the tongue, and their relation to the trailer vehicle and the tractor vehicle.
Fig. 4 is a plan view of the substance of Fig. 3.
Figure 8:
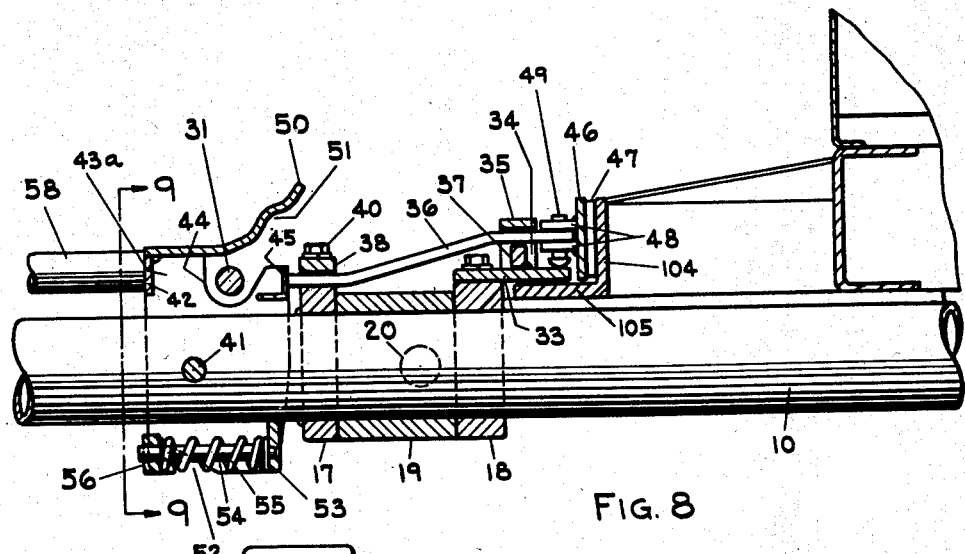
Fig. 8 is a vertical section on the line 8—8 of Fig. 6.

Referring to Fig. 8, an abutment collar 17, having a flat top surface, is fastened on tongue 10, in spaced relation to collar 18, and a swivel collar 19 is mounted on the tongue between the abutment collars 17 and 18, so as to rotate about the longitudinal axis of the tongue. At diametrically opposite points, the swivel collar 19 has two sockets 20 which receive the trunnion pins 22 and 22a (Fig. 14), to be described, mounted in plates 21 and 21a, connected by cross bar 23, located at the apex of a triangular locking frame. The triangular frame is shown generally in Fig. 6, and comprises two leg members 26 and 26a directed outwardly and forwardly from the apex, and a cross member 30 joined to the legs 26 and 26a by abutment brackets 28 and 28a respectively. Members 26, 26a, and 30 are made of tubular stock and are fitted into correspondingly aligned and fitted sockets in the abutment brackets. Toward the apex of the triangular frame, where members 26 and 26a are in proximity, a member 25 (Fig. 14) is welded to the end of member 26 and a member 25a is welded to the end of member 26a. Member 25 has a trunnion pin 22 and member 25a has a trunnion pin 22a, said trunnion pins 22 and 22a fitting in the trunnion pin sockets 20 in the swivel collar 19 (Fig. 8). Integral with members 25 and 25a (Fig. 14) are locking cams 24 and 24a which, when the triangular frame is swung to vertical position as shown in Fig. 3, enter the notches 14 (see Fig. 14) in the horizontal flange of the arcuate track 13.

Figure 1:
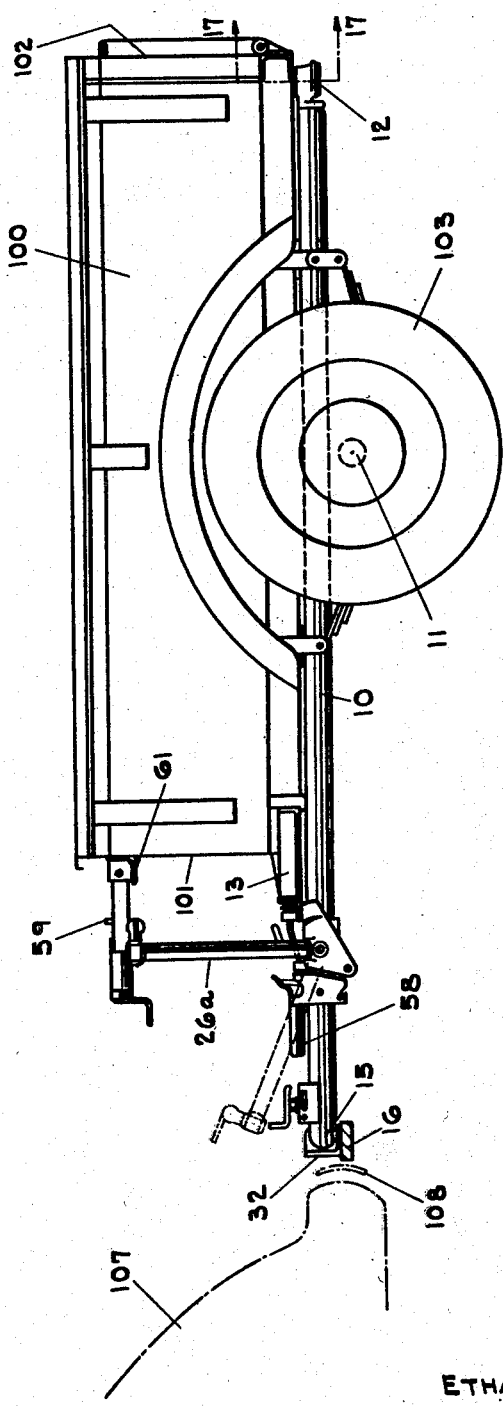
Fig. 1 is a side elevation, partly in section, of the invention as applied to the hitching of a two-wheeled trailer to the rear bumper of an automobile tractor.

When in vertical position, therefore, the tongue is securely locked so that it may not swing horizontally on pivot 12 (Fig. 1). In this position therefore the trailer may be drawn by the tongue on forward motion of the tractor, by means of the universal joint connection on the draw bar, and the trailer will thereupon follow the path of the tractor vehicle as it moves forwardly.

Referring to Fig. 14, a cross member 31 joins the members 26 and 26a. This cross bar 31, when the triangular frame member is swung to a position intermediate (Fig. 7) between the vertical position, just described, and the horizontal position, to be described (see Fig. 6), acts to release brake mechanism to be described.

Figure 6:
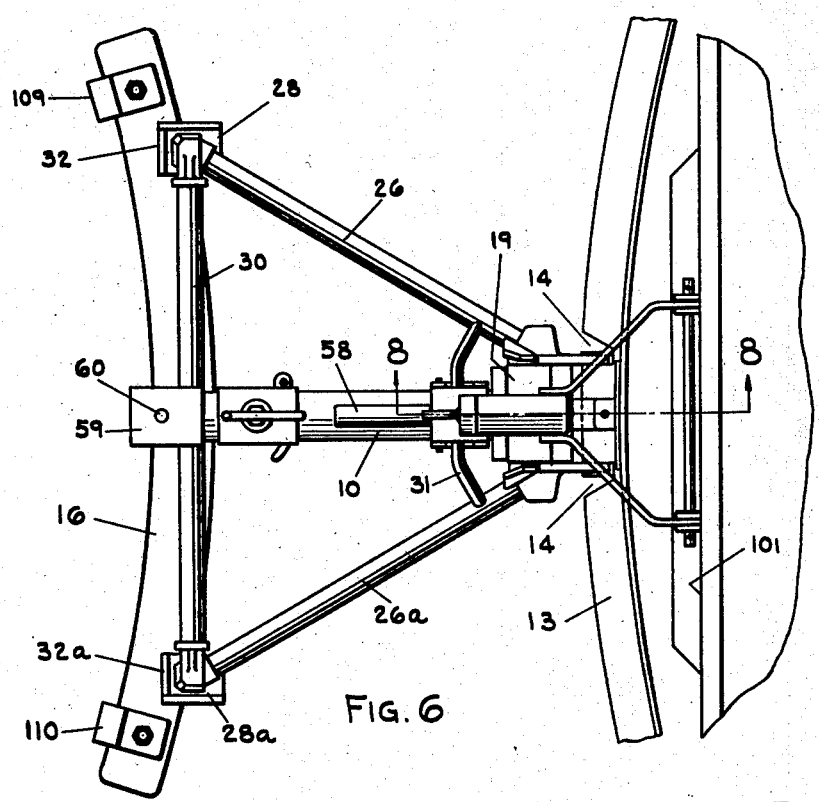
Fig. 6 is a plan view of the substance of Fig. 5.
Figure 7:
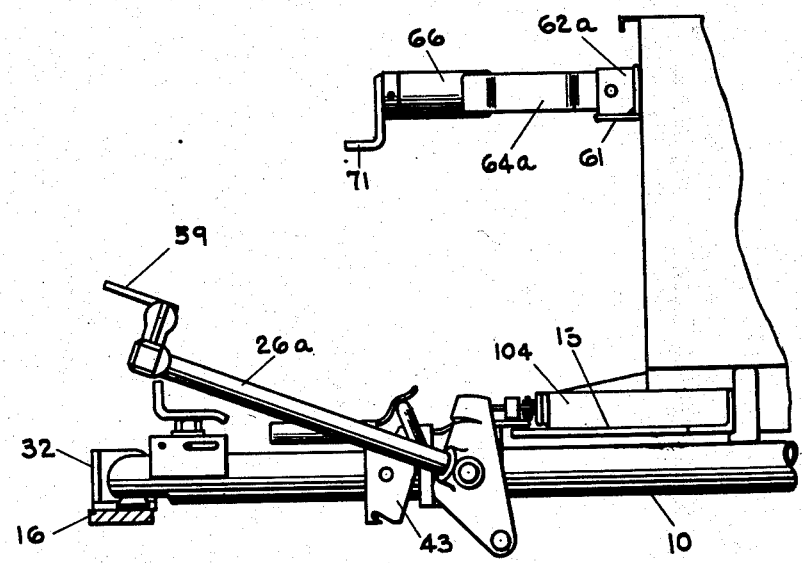
Fig. 7 is a side elevation, similar to Fig. 3, showing the adjustable means in an intermediate position in which the tongue is free to move horizontally about the trailer pivot or the tractor pivot.

When the triangular frame, composed of members 26, 26a and 30, is swung to the horizontal position, shown in Fig. 6, the abutment members 28 and 28a rest in sockets formed by three-sided angle plates 32 and 32a (see also Fig. 4) which are welded, or otherwise fastened to the draw bar 16. Under such circumstances the tongue is released from locking engagement with the arcuate track 13 and is rendered immobile with the longitudinal center line of the tractor vehicle by reason of the abutment of members 28 and 28a in sockets 32 and 32a. Under such circumstances, if the tractor vehicle is moved backward, the trailer vehicle will move backward and will swing about the pivot 12 as the tongue is directed by movement of the tractor vehicle to one side or another. This action on backward motion has been fully described in my co-pending application for United States Letters Patent, Serial No. 648,591, above referred to.

In changing the hitch adjustment for forward motion to adjustment for backward motion, or vice versa, it is obvious that arrangements must be made to correlate either the locking cams 24 and 24a with the notches 14, or to correlate the abutments 28 and 28a with the sockets 32 and 32a. This requires some manipulation of the tongue with relation to the trailer and to the tractor vehicle and it is necessary, therefore, inasmuch as such movement is made by the operator, that the tongue be free to move on pivot 12 as well as free to move on the ball and socket 15. A brake means is provided, which will be next described, to prevent, ordinarily, the undamped swinging of the tongue about the vertical pivot pin 12 and, therefore, an intermediate position is provided for the triangular frame member, between the vertical position and the horizontal position, in which the triangular frame member is resiliently held, and in which the brake mechanism ordinarily in effect is rendered ineffective.

Figure 10:
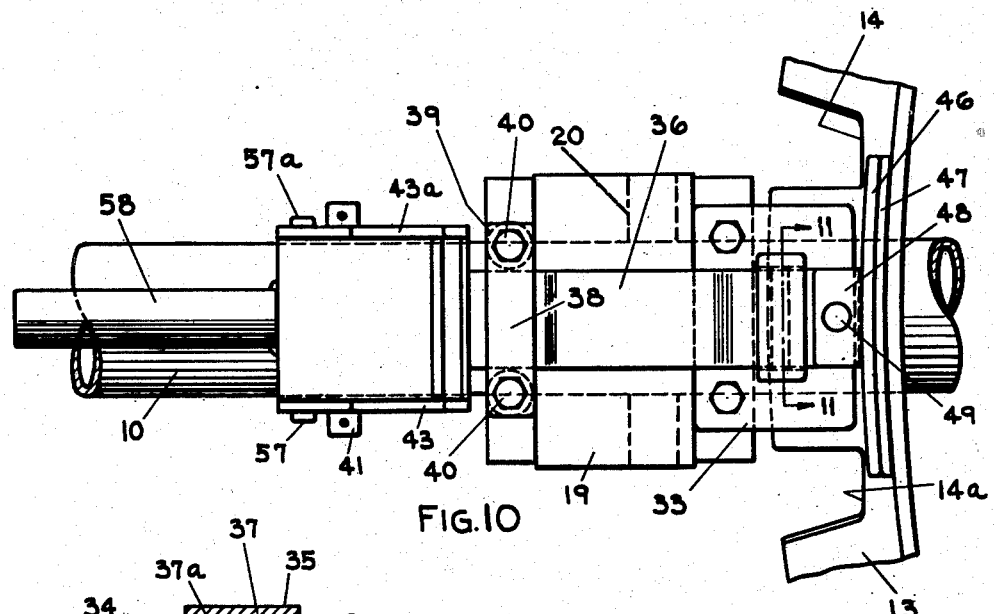
Fig. 10 is a plan view of a portion of the tongue, forward of the trailer, and the mountings thereon which support the adjustable means.
Figure 11:
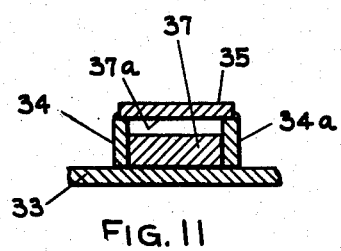
Fig. 11 is a vertical sectional view of a portion of Fig. 10 on the line 11—11.

Plate 33 (Fig. 8) fixed to top of abutment collar 18, as heretofore described, has two spaced ears 34 and 34a (see also Fig. 11) projecting upwardly therefrom, which ears are connected across the top by a cross bar 35. A rib 37, fastened to the top of plate 33, projects upwardly, leaving a guide space 37a through which the rear end of a braking link 36 extends. The braking link 36 extends forwardly and downwardly in an offset manner, and the forward end slides on top of abutment collar 17, beneath a transverse strap 38, secured in spaced relation to the top of the collar 17 by means of bolts 40 and washers 39 (see Fig. 10). A brake shoe 46 is fastened to the rear end of the braking link 36 by means of forwardly extending ears 48 fastened to the brake shoe, which receive between them the rear end of the brake link, to which the brake shoe is pivotally connected by the pin 49. The brake shoe 46 has secured to the rearward face thereof brake lining 47 adapted to make braking contact with the vertical flange 104 of track 13. When the braking link is forced rearwardly, a braking pressure is applied against the vertical flange 104 causing resistance to any swinging movement of the tongue around the pivot pin 12 (Fig. 1) at the rear end of the trailer bed.

Figure 5:
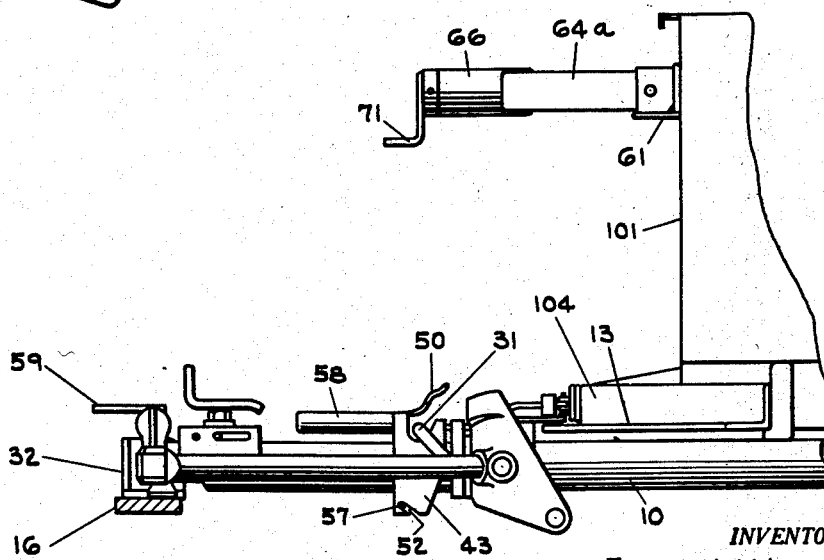
Fig. 5 shows the adjustable means of Fig. 3 positioned for rearward movement of the trailer.
Figure 9:
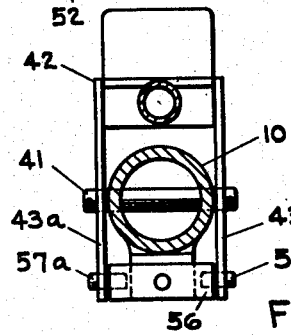
Fig. 9 is a vertical section taken on the line 9—9 of Fig. 8.

Forwardly of collar 17, a yoke 42 (Figs. 8 and 9), having legs 43 and 43a which straddle the tongue 10, is pivotally connected to the tongue by the pin 41, which extends transversely through the legs 43 and 43a, and the tongue 10. The upper portion of each leg 43 has a notch 44 (Fig. 8) formed therein, which receives the cross bar 31 (see also Fig. 14) of the triangle frame, when the triangle frame is in the horizontal position (see Fig. 5), which is the position for backing the trailer. The yoke includes a cross bar 45 (Fig. 8) in position to engage the front end of the braking link 36. The yoke includes also a rearwardly and upwardly extending tongue 50, having a depression 51 therein. A stop member 53 is fixed to the lower portion of the tongue 10, by welding or otherwise, and is disposed between legs 43 and 43a of the yoke 42. The rear end of a pin 54 is seated in a hole in stop member 53 and the forward end of this pin 54 extends to a hole in a plate 56, which is positioned between the legs 43 and 43a of the yoke. Laterally extending pins 57 and 57a are secured to the plate 56, as by welding, and the extending ends of these pins are received in notches 52 formed in the lower portion of the legs 43 and 43a of the yoke (see Fig. 5). A spring 55 surrounding the pin 54, extends between the stop member 53 and the plate 56. This spring 55 tends to expand with considerable force, and thus tends to turn the yoke 42 clockwise, as seen in Fig. 8, about the pin 41, so as to force the braking link 36 rearwardly to apply braking pressure against the vertical flange 104 of track 13. A release rod 58 is secured to the upper portion of the yoke 42 and extends forwardly therefrom, in line with and above the tongue 10. Pressure applied downwardly on this release rod 58 will rock the yoke 42 counter clockwise, against the action of spring 55, so as to relieve the braking pressure to facilitate the swinging of the tongue around pivot pin 12 as, for instance, when it is desired to line up the notches 14 of the track 13 with the cams 24 and 24a (Fig. 14), so that the triangle may be moved to vertical position. It is to be noted that tongue 50 (Fig. 8), of the yoke 42, extends above the cross bar 31 of the triangle frame, when the latter is in the horizontal or backing position, and this tongue 50 yieldingly prevents the movement of the triangle frame upwardly from the horizontal position. As the triangle frame is swung from the horizontal to the vertical position, the cross bar 31 engages the formed member 50 (Fig. 8) and rocks the yoke 42 counter clockwise to relieve the braking pressure, and the depression 51 formed in member 50 provides for holding the triangle frame in this intermediate position, in which the braking pressure is released and in which the tongue may be swung easily to one side or the other to line up the notches 14 and the cams 24 and 24a, which fit into the notches 14 when the triangle frame reaches the vertical position. Downward movement on rod 58 in addition to releasing the brake will help to relieve the detent action of the depression 51 of formed member 50, so the triangle frame can be moved freely from vertical to horizontal position, or vice versa.

When the triangle frame is in vertical position, as shown in Fig. 3, in which the cams 24 engage the notches 14, the trailer is ready to be drawn forward by the tractor vehicle and will accommodate itself to the turning of the tractor vehicle by reason of the pivot action of the ball and socket connection to the draw bar 16.

To prevent the triangle frame from moving out of vertical position, a latching means with positive locking action has been provided to hold the triangular frame in vertical position against any tendency to its displacement therefrom, by jolting or jarring of the vehicles as they are passing over rough spots in the road. Referring to Fig. 6, welded to the transverse member 30, forming the base of the triangular frame, is a plate 59 having a hole 60 bored therein. As the triangular frame is moved to vertical position this plate 59 is carried with the frame until it reaches a position as shown in Figs. 3, 12 and 13. Fastened to the forward end of the trailer bed is an angle plate 61 (Figs. 3 and 12), which has projecting forwardly therefrom two pairs of spaced ears 62 and 62a. The rear portion 63 of an arm 64 is received between the ears 62, and the rear portion 63a of an arm 64a is received between the ears 62a. A rod 79 passing through holes in the ears and the rear portion 63 and 63a pivotally connects arms 64 and 64a to the trailer. The front ends 65 and 65a, of the arms 64 and 64a, are bent toward one another and have forwardly extending parallel portions which are fastened to opposite sides of a housing 66. A screw 67 (Fig. 13) rotatably mounted in housing 66, has a shoulder 68 engaging a shoulder 69 in the front end of the housing, and has a forwardly extending spindle portion 70 which projects through a hole in the front end of the housing 66. Spindle 70 has a collar 72 pinned thereto, which collar has a handle crank 71 secured thereto for turning the screw. A sleeve 73 is slidable in the housing 66, said sleeve having an external longitudinally extending groove 74, which receives a stud 75 fastened to the housing 66, so as to permit longitudinal movement of the sleeve in the housing but preventing rotation of the sleeve relative thereto. The sleeve 73 has an internally threaded portion 76 which is engaged by the external screw threads of the screw 67. The rear end of the sleeve carries a stud head 77 which is attached thereto by a pin 78. By turning the crank 71 which turns the screw 67, the stud head 77 can be advanced from or retracted within the housing 66. When this stud head 77 is advanced into a position externally of the housing it may engage the hole 60 in plate 59, if the triangle is in the vertical position and if the embracing bail comprising the housing 66, members 64 and 64a, and their pivotal connections to the trailer bed, are in the position shown in Fig. 3. The stud head 77 may be retracted by turning the crank 71, and then the locking bail device can be swung about the pivot rod 79 to permit the triangle frame to be swung to and away from horizontal position. It will thus be understood that this positive locking means, when made effective, absolutely prevents any movement of the tongue with reference to the trailer bed, when the triangular frame is in its vertical position for forward motion.

As shown in Fig. 18, a modified form of locking bail is provided, the purpose of which is to resiliently hold the bail in the vertical position, in which it is ineffective, or in the horizontal position, in which it is effective, when placed in either of such positions by the operator. Attached to angle plate 61, fastened to the front side 101 of the trailer are two forwardly extending ears, one on each end, that on the right end supporting the right arm 162 of the bail, and that on the left, not shown, supporting the left arm of the bail. This structure is the same as in the preferred form except that only one supporting ear is used for each bail arm. Rod 79, passing through holes in both ears and both bail arms, makes the pivotal coupling. Projecting from the rear end of each bail arm is a lobe, like lobe 170 in the right arm, and between the lobes is fastened a rod 171 having a sleeve 180 rotatably mounted at the middle thereof. Fastened to the sleeve is a rod 172 which projects through a washer 173 and a hole 174 in a bracket 175 fast to the front 101 of the trailer. Surrounding the rod 172 between washer 173 and sleeve 180 is a compressed spring 176 which pushes rod 171 either clockwise or counterclockwise around the axis of rod 79. The parts are arranged so that when the operator moves the bail from vertical position, shown in dotted line, in which the bail is urged clockwise by the spring, the parts pass a dead-center point when rods 79, and 171, and hole 174 are in line, after which the spring 176 reaches the position shown in full line in Fig. 18 in which the bail is urged counterclockwise. Thus, the bail is resiliently retained in either the vertical or horizontal position.

Assuming that the triangular frame is in the vertical position and that the locking member shown in Figs. 12 and 13 is in position to lock the triangular frame in vertical position, the operation of the mechanism is as follows:

The tongue of the trailer is attached to the draw bar by means of the ball-and-socket connection 15, and, if the intended motion of the vehicle is to be in a forward direction, the tractor vehicle is set in motion forwardly and the trailer will follow in the track of the tractor vehicle. Assuming it is desired to back the trailer, the tractor vehicle is moved forward in a straight line for a distance to insure the trailer and tractor being in a straight line, and then the locking member shown in Figs. 12 and 13 is unscrewed and pivoted upwardly to release the triangular member so that it may be moved toward the horizontal position where the bracket members 28 and 28a of the triangle are fitted into the angle pieces 32 and 32a respectively, on the draw bar. The triangle frame when so pushed clear to the horizontal position, conditions the trailer ready for backward movement, by backward movement of the tractor vehicle. When it is desired thereafter, to condition the hitch for forward movement, the triangle frame is raised to intermediate position and the trailer body swung to where the tongue is in line with the longitudinal center line of the trailer, and then the triangle frame is raised to vertical position and locked by the locking bail.

While the form of the structure herein shown and described is admirably adapted to fulfill the stated objects of the invention, it is not intended to confine the invention to the embodiment shown as it is capable of various embodiments all coming within the scope of the claims which follow.

Having thus described my invention, what I claim as new and useful and desire to secure by Letters Patent, is:

1. A trailer hitch including the combination of a trailer bed; a transverse axle carrying said bed; a tractor frame member; a tongue pivotally connected to said trailer bed at a point to the rear of said axle, said tongue being also pivoted to said tractor member at its other end; means operable to one position for rendering the trailer carried pivot immobile horizontally and operable to another position for rendering the tractor carried pivot immobile horizontally; and means including a plate member on the operable means and a bail on the trailer frame cooperable to positively lock the operable member in position where the tongue is immobile for horizontal movement around the trailer pivot.

2. A trailer hitch including the combination, a tractor vehicle; a trailer vehicle having a two-wheeled running gear; a tongue connecting the tractor vehicle and the trailer vehicle, said tongue being pivotally mounted for horizontal movement to the trailer vehicle to the rear of the running gear and said tongue being mounted by its forward end to the rear end of the tractor vehicle; adjustable means movable to a position for locking the tongue with the longitudinal mid-line of the trailer, said means being movable to another position where the tongue is free to move around the trailer held pivot in a horizontal direction; and positive latching means to hold the movable member in the position in which the tongue is locked with the mid-line of the trailer vehicle, said latching means including a bail movably mounted on the trailer which bail is movable to embrace the movable member when in position in which it locks the tongue with the trailer, said latching means also including a stud held by the bail which stud may be moved to lock the movable means secure in the embrace of the bail.

3. A trailer hitch including the combination of a trailer bed; a transverse axle carrying said bed; a tractor frame member; a tongue pivotally connected to said trailer bed at a point to the rear of said axle for horizontal movement, said tongue also being pivoted at its other end to said tractor frame member for limited universal movement; means operable to one position for rendering the trailer carried pivot immobile and operable to another position for rendering the tractor carried pivot immobile horizontally; and means carried by the trailer to lock the operable means in the position in which the trailer carried pivot is immobile, said locking means including a pivoted bail movable to embrace the operable means, said locking means including a stud movable to engage a hole in the operable means to positively lock the same in the position in which the tongue is immobile in the tractor pivot.

4. In a trailer hitch, the combination of a trailer bed; a pivot carried by the trailer bed; a tongue pivoted to said pivot for horizontal motion; means to latch the tongue in line with the center line of the trailer; and means to lock the latching means said last means including a screw driven stud engageable in a hole in the latch means.

5. In a trailer hitch, the combination of, a two wheel trailer comprising a bed, a transverse axle, and a wheel on either end of the axle; a pivot depending from the rear end of the trailer bed; a tongue pivoted to said pivot for horizontal motion, said tongue extending forwardly along the bottom side of the trailer bed between the wheels; a track carried by the trailer bed, said tongue in its horizontal movement moving adjacent said track, and said track having locking notches therein; means carried by the tongue and movable from an unlatched position to a latched position where it engages the notches in the track for latching the tongue in line with the center line of the trailer bed; and a locking means carried by the front end of the trailer bed, said means engaging, by means of a manually operated screw stud, a hole in the latch means for locking the latch means in latching position.

6. In a trailer hitch, in combination, a two wheel trailer comprising a bed and running gear having an axle transverse of the bed; a tongue pivot fastened to the underside of the bed at the rear end thereof; a tongue pivotally connected to said pivot, for movement in a horizontal direction parallel with the bed of the trailer and projecting forwardly between the wheels thereof; a latch plate carried by the trailer bed; a movable latching member carried by the tongue movable to engage the horizontal flange of the arcuate track member so as to hold the tongue in alignment with the center line of the trailer bed; a means including a yoke-like bail pivoted to the front end of the trailer and movable to embrace the latch means when in latched position to embrace it; and a stud mounted in the bail and movable by means of a screw from the bail member into a hole in the latch member to positively hold it in latched position.

7. In a trailer hitch, in combination, a trailer bed; a transverse axle fastened underneath the bed at a point between the front end and the rear end thereof, said axle being equipped with a wheel on either end; a pivot extending downwardly from the bed at the rear end on the longitudinal median line thereof; a tongue pivoted to said pivot for horizontal movement, said tongue extending underneath the bed between the wheels and projecting beyond the front of the trailer bed; a locking frame swingably mounted on the projecting end of the tongue, said locking frame having locking cams and being swingable from a vertical position to a horizontal position, and said locking frame having on its outer end a plate with a hole therein; an arcuate track attached to the front end of the trailer bed, said arcuate track having locking notches therein cooperating with the cams on the locking frame attached to the tongue, so that when the locking frame attached to the tongue is moved to the vertical position with the tongue in line with the longitudinal center line of the trailer bed the cams lock into the notches, holding said tongue rigid in said longitudinal center line position; and a bail swingably mounted on the front end of the trailer bed and adapted to be swung down over the locking member when it is in the vertical position, said bail having a stud therein movable to and away from a locking position by means of a crank drive, which stud may be screwed by means of the crank into the hole in the plate on the locking frame to secure the locking frame in vertical position.

8. In a trailer hitch, in combination, a trailer bed; a transverse axle attached to the underside of the trailer bed between the front and rear end thereof, said axle having a wheel on either end; a pivot fastened to the underneath side of the trailer bed at the rear end thereof on the longitudinal center line of the trailer bed; a tongue pivoted to said pivot for horizontal motion, said tongue extending forwardly underneath the bed between the wheels and projecting beyond the front of the trailer bed; an arcuate track attached to the front end of the trailer bed near the bottom thereof, said track being arcuate with respect to the pivot, and said track having an upwardly extending flange; means fastened to the tongue which cooperates with the track for holding said tongue parallel with the plane of said track as it swings on its pivot; a brake shoe slidably supported by the tongue so that said shoe is engageable with the vertical flange of the track as the tongue swings about its pivot; and a spring urged means normally pressing the brake shoe towards the vertical flange of the track so as to frictionally dampen the swinging motion of the tongue about its pivot.

9. In a trailer hitch, in combination, a trailer bed; a transverse axle fastened underneath the trailer bed between the front and rear end thereof, said axle having a wheel on either end; a pivot fastened to the bottom side of the rear end of the trailer bed on the longitudinal center line of said trailer bed; a tongue pivoted to said pivot for horizontal motion, said tongue extending forwardly beneath and beyond the trailer bed, between the wheels thereof; an arcuate track having a horizontal flange and a vertical flange, both arcuate to the pivot; means fastened to the tongue and engaging the horizontal flange in the arcuate track to keep said tongue, in its movement about the pivot, in a plane parallel to the arcuate track; a slidable brake equipped with a brake shoe adapted to engage the vertical flange in the track, which brake is mounted on the tongue; a spring urged means normally causing the brake to slide and cause the brake shoe to be pressed into braking engagement with the vertical flange, but being movable against the spring action to a releasing position where the said brake shoe is not urged against the vertical flange; a locking frame swingably mounted on the tongue and swingable to a vertical, an intermediate, and a horizontal position, said locking frame having locking cams thereon which when the locking frame is in the vertical position the cams engage notches in the horizontal flange of the arcuate track so as to lock the tongue in line with the longitudinal center line of the trailer bed, and said locking frame having means cooperating with spring urged means so that when said locking frame is in intermediate position the spring urged means is held from urging the brake shoe against the vertical arcuate surface of the track, said spring urged means having a formed part thereof which tends to resiliently hold the locking means in intermediate position.

10. In a trailer hitch for cooperation with a transverse draw bar on the rear end of a tractor vehicle, in combination, a trailer bed; an axle fastened underneath said trailer bed transversely thereof and between the front and the back ends of said trailer bed, said axle having a wheel on either end; a pivot fastened underneath the rear end of the trailer bed on the median center line of the trailer; a tongue pivoted to said pivot so as to be horizontally swingable thereabout, said tongue extending forwardly underneath the trailer bed between the wheels and projecting beyond the front end of the trailer bed; a universal pivot, including a ball and socket joint, for fastening said tongue to the draw bar, said pivot being located in line with the longitudinal center line of the tractor vehicle; an abutment member located on the draw bar on either side of the pivot point, said abutments being equally spaced from the center line of the tractor; a triangular shaped member having a pivotal connection at its apex to the tongue at a point between the front end of the trailer and the draw bar, said pivotal connection of the triangular member permitting it to be swung from a vertical position to a horizontal position, the legs of said apex at the outermost ends abutting against the abutment members on the draw bar when said frame is in its horizontal position, whereby the tongue is held in line with the longitudinal center line of the tractor vehicle, and said frame member having integral therewith locking cams and a brake release piece; an arcuate track fastened to the front end of the trailer bed, said track being arcuate to the pivot on the rear end of the trailer bed and said track having a horizontal flange and a vertical flange, said horizontal flange having locking notches cut therein so that when the triangular frame member is swung to vertical position the cams enter said notches and lock the tongue in line with the longitudinal center line of the trailer; a brake shoe mounted on the tongue and positioned so as to be slidable against the vertical flange of the arcuate track to brake the swinging movement of the tongue around the pivot on the trailer, and slidable away to render it ineffective as a brake; a yoke pivoted to the tongue which when rocked in one direction causes the brake shoe to slide into pressure contact with the vertical arcuate surface and when rocked in a reverse direction releases the pressure contact of said brake shoe; resilient means normally rocking the yoke to cause the brake shoe to become effective as a brake; and a formed member on said yoke which, when the triangular frame is brought to an intermediate position, causes the brake release member thereon to cooperate therewith to rock the yoke against the resilient spring to release the brake, and said spring acting also to resiliently hold said triangular frame in intermediate position.

11. In a trailer hitch mechanism, including a trailer having a forwardly projecting tongue pivoted to its rear end, which tongue is normally free to swing about said rear end pivot in a horizontal direction, the combination of an arcuate track member fastened to the front end of the trailer, said member being arcuate to the pivot and being parallel to the swing of said tongue horizontally, and said member having a vertical flange and a horizontal flange, said horizontal flange having locking notches therein; a brake means carried by the tongue, which means normally resiliently applies a brake shoe to the vertical surface of the track to dampen horizontal movement of the tongue around its pivot, said brake means having a formed member thereon; a locking frame member of generally triangular shape pivoted by its apex to the tongue, said triangular member being swingable about its pivot from a vertical to a horizontal position, and said triangular frame having integral therewith locking cams which cooperate with notches in the horizontal flange of the arcuate track, when said triangular frame is in vertical position and the tongue is in line with the longitudinal center line of the trailer, for locking the tongue in line with the longitudinal center line of the trailer, and said triangular frame member having a brake release member which, when the triangular member is swung toward the horizontal in an intermediate position between vertical and horizontal position, contacts the formed member on the brake means to release the brake by counter action against the resilient means tending to apply the brake to the braking surface of the track, and said resilient means by means of the formed member acting to resiliently but releasably hold the triangular frame member in intermediate position when the brake is so released.

12. In a trailer hitch, in combination, a two wheeled trailer, the wheels being mounted on a transverse axle; a pivot on the longitudinal center line of said trailer near the rear end thereof, to the rearward of the axle; a tongue pivotally mounted on said pivot for horizontal swinging, said tongue extending forwardly between the wheels and extending beyond the front of the trailer; and means resisting the swinging of the tongue, said means including a frictional brake held in braking pressure against a braking surface by a resilient means; and a release rod attached to the resilient means for applying counter force to the resilient means to release the braking effect.

13. In a trailer hitch, in combination, a trailer, a tongue pivotally connected to said trailer for horizontal swinging; a braking surface mounted on the trailer; a spring pressed brake mounted on the tongue, said brake normally being held against the braking surface to frictionally resist any attempt to swing the tongue; and means attached to the spring means movably operable to counteract the resilient force urging the brake in contact with the braking surface, whereby the brake is released and the tongue is free to move horizontally about the pivot.

14. In a trailer, in combination, a trailer having a transverse axle with a wheel mounted on either end of the axle; a pivot mounted on the longitudinal center line of the trailer; a tongue pivotally mounted on the pivot and extending forwardly beyond the trailer, said tongue being swingable horizontally on said pivot; a vertically extending flange on the track attached to the front end of the trailer, said track being arcuate to the pivot; a brake shoe normally pressed resiliently against the track to frictionally resist the horizontal swinging of the tongue, said brake being releasable by counteraction against said resilient means; a means mounted on the tongue for fastening the tongue in line with longitudinal center line of the trailer, said fastening means being movable to an unlocking position, said fastening means when in said unlocking position contacting the braking means to counteract the resilient force thus releasing the brake.

15. In a trailer hitch, in combination, a trailer having a transverse axle with a wheel mounted on either end of the axle; a tongue for the trailer pivotally mounted to the rear end of the trailer in the longitudinal center line thereof, said tongue extending forwardly between the wheels of the trailer beyond the front end thereof and being swingable horizontally on the pivot; a track fastened to the front of the trailer adjacent the plane of horizontal movement of the tongue, said track being arcuate to the tongue pivot, and said track having a braking surface thereon; a yoke pivoted on said tongue by a horizontal pivot located on the tongue forwardly of the front end of the trailer, said yoke being rockable in a vertical plane parallel with the tongue; a spring mounted between the tongue and the yoke which tends to rock the yoke so the top end thereof moves toward the front of the trailer; a brake shoe slidably mounted on top of the tongue for motion parallel with the axis of the tongue toward and away from the track, said brake shoe extending between the yoke and the braking surface of the track so that it is normally pushed by the spring urged disposition of the yoke into braking engagement with the track; and a release rod attached to the yoke and extending forwardly therefrom, which release rod, when pressed downwardly rocks the yoke against the pressure of the spring, releasing the brake.

16. In a trailer hitch, in combination, a trailer; a tongue pivotally mounted on the trailer to the rear end thereof on the longitudinal center line, said tongue extending forwardly beyond the front of the trailer and being swingable horizontally on the pivot; a yoke straddling the tongue forwardly of the front of the trailer, and being rockable in a vertical plane parallel with the longitudinal axis of the tongue; a spring located between the tongue and the yoke which resiliently holds the yoke rocked with the top thereof inclined toward the trailer; an arcuate track mounted on the front of the trailer, said track being concentric with the pivot; a braking link slidably mounted on the top of the tongue between the top of the yoke and the arcuate track, said link having a brake shoe rockably mounted on the rear end thereof, which brake shoe is normally in braking contact with the braking track; a release rod extending forwardly from the yoke, by which release rod the yoke may be rocked against the action of the spring to release the brake; a formed member extending upwardly and rearwardly from the yoke; a locking frame pivoted to the tongue between the front end of the trailer and the yoke, which locking frame is movable from a locking position in which it locks the tongue in line with the longitudinal center line of the trailer and movable to an unlocking position in which it makes contact with the formed member thus rocking the yoke to brake releasing position, and in which unlocking position the locking frame is retained by the formation of the formed member pushed against it by the spring.

ETHAN W. VARS.

REFERENCES CITED

The following references are of record in the file of this patent:

UNITED STATES PATENTS

| Number | Name | Date |
|---|---|---|
| 1,573,320 | Kline | Feb. 16, 1926 |